United States Patent [19]

Schoneman et al.

[11] 4,020,255

[45] Apr. 26, 1977

[54] CONTINUOUS INSITU CATALYST ADDITION FOR POLYBUTADIENE POLYMERIZATION

[75] Inventors: Donald P. Schoneman, Tallmadge; Robert W. Stachowiak, Akron, both of Ohio

[73] Assignee: The Goodyear Tire & Rubber Company, Akron, Ohio

[22] Filed: May 7, 1975

[21] Appl. No.: 575,311

[52] U.S. Cl. .............................. 526/133; 526/335
[51] Int. Cl.$^2$ ............... C08F 4/14; C08F 4/70; C08F 136/06
[58] Field of Search ............. 260/94.3; 526/133
[56] References Cited

UNITED STATES PATENTS

| 3,170,907 | 2/1965 | Ueda et al. | 260/94.3 |
| 3,464,965 | 9/1969 | Yasunaga et al. | 260/94.3 |
| 3,471,462 | 10/1969 | Matsumoto et al. | 260/94.3 |
| 3,513,149 | 5/1970 | Smith et al. | 260/94.3 |
| 3,844,974 | 10/1974 | Throckmorton | 260/94.3 |
| 3,845,029 | 10/1974 | Throckmorton et al. | 526/133 |
| 3,985,677 | 10/1976 | Throckmorton et al. | 526/133 |
| 3,985,941 | 10/1976 | Pierson et al. | 526/133 |

*Primary Examiner*—Alan Holler
*Attorney, Agent, or Firm*—F. W. Brunner; J. Y. Clowney

[57] ABSTRACT

There is disclosed a method of preparing high cis-1,4-polybutadiene which comprises continuously polymerizing butadiene in mixture with an inert aliphatic or cycloaliphatic solvent employing as a catalyst a mixture comprising (A) at least one trialkyl aluminum wherein the alkyl group contains from 2 to 8 carbon atoms, (B) at least one nickel salt of carboxylic acids and (C) at least one boron trifluoride complex of ethers in which each of the individual catalyst components are continuously injected into the polymerization vessel containing the mixture of butadiene and inert solvent.

5 Claims, No Drawings

CONTINUOUS INSITU CATALYST ADDITION FOR POLYBUTADIENE POLYMERIZATION

This invention is directed to an improved process for the conversion of butadiene to a solid rubbery polybutadiene having a high content of cis-1,4 configuration; that is, a polybutadiene containing greater than 90 percent cis-1,4 configuration and preferably greater than 95 percent.

There are several methods known for the preparation of high cis-1,4 polybutadiene, one of which is disclosed in U.S. Pat. No. of 3,170,907, issued Feb. 23, 1965. In this patent there is disclosed a process for the preparation of polybutadiene having a cis-1,4 content of 97.4 percent. This process comprises polymerizing butadiene in a hydrocarbon diluent at 40° C by adding butadiene to a catalyst system prepared by mixing nickel naphthate, boron trifluoride etherate and triethylaluminum. It is disclosed broadly that the catalyst is obtained by affecting reaction through mixing (A) an organic carboxylic acid salt of nickel, (B) boron trifluoride etherate and (C) trialkyl aluminum, the mole ratio of the trialkyl aluminum to boron trifluoride etherate being in the range of 0.1 to 5.0 and the mole ratio of the nickel salt to the trialkyl aluminum being in the range of 0.03 to 7.0.

In U.S. Pat. Nos. 3,464,965, issued Sept. 2, 1969, and 3,471,462, issued Oct. 7, 1969, there is disclosed what might be termed improvements on the process disclosed in U.S. Pat. No. 3,170,907. In U.S. Pat. No. 3,471,462, the patentees disclose that the catalysts of U.S. Pat. No. 3,170,907 are not perfectly soluble in hydrocarbons in that they produce a black precipitate in concentrated solutions and only appear to be soluble in diluted solutions. When the polymerization system contains large amount of impurities or when the monomer concentration is low, the polymerization activity of the catalysts disclosed in U.S. Pat. No. 3,170,907 patent decreases. The patentees of the U.S. Pat. No. 3,471,462 patent provide a method of preforming the nickel salts of carboxylic acids, the boron trifluoride etherate and the trialkylaluminum in the presence of small amounts of conjugated diolefins. Thus, this patent discloses a process that butadiene is contacted in a liquid phase with a catalyst prepared from three components which has been preformed together in a mixture in the presence of a hydrocarbon solvent of (A) a nickel salt of carboxylic acids, (B) boron trifluoride etherate, (C) an organoaluminum compound and (D) a conjugated diolefin such as butadiene, the said mixture being formed in a sequence that the butadiene is added to the mixture before the nickel salt and the organoaluminum compound are allowed to react, said mixture being aged at a temperature of 20° to 100° C. The disclosure of U.S. Pat. No. 3,464,965 is essentially the same as the disclosure of U.S. Pat. No. 3,471,462 except that the catalyst mixture is aged at least 16 minutes. Thus, the patentees of these two prior patents provide a method for stabilizing and preforming such a catalyst to increase its solubility and to prevent its loss of catalyst activity.

It is noted that in every one of the actual examples presented in the aforementioned prior patents, the patentees conducted the actual experiments in an inert solvent system which was either benzene or toluene. In each of these patents, the patentees state that inert solvent systems including aromatic hydrocarbons as well as aliphatic hydrocarbons can be employed.

It has been discovered, however, that if one wishes to prepare a polybutadiene having a cis-1,4content above 95 percent utilizing a catalyst system comprising (A) an aluminum trialkyl, (B) nickel salt of carboxylic acid and (C) boron trifluoride diethyl ether complex as is shown in U.S. Pat. Nos. 3,170,907 or 3,464,965 or 3,471,462 and employ, instead of an aromatic solvent such as benzene or toluene, an aliphatic solvent system such as pentane or hexane, the results are not at all satisfactory for a commercial operation. It has been observed that the catalyst components such as trialkyl aluminum and a nickel salt of carboxylic acid soluble in aliphatic hydrocarbons such as pentane or hexane as well as aromatics. On the other hand, it has been observed that boron trifluoride diethyl etherate is not sufficiently soluble in the aliphatic solvents and when certain combinations of the catalyst components, aluminum trialkyls, nickel salts of carboxylic acids and boron trifluoride diethyl etherates are combined there is formed a catalyst which is not successful in a commercial operation. This catalyst is not soluble but instead must be suspended or dispersed in the aliphatic hydrocarbons. The insolubility of the catalyst leads to the plugging of the catalyst feed lines to the polymerization reactor and the setting out of the catalyst in the catalyst make up tank. Even the preforming of such catalysts in accordance with the U.S. Pat. Nos. 3,464,965 or 3,471,462 procedures, employing a conjugated diolefin as a catalyst stabilizer, does not provide a completely satisfactory catalyst system for the polymerization of butadiene in aliphatic solvents. Even the preformed stabilized catalyst system is unsatisfactory because of the insolubility problems with the preformed, stabilized catalyst when using an aliphatic hydrocarbon solvent system such as pentane or hexane.

It is, therefore, an object of this invention to provide a process whereby when one employs an aliphatic or cycloaliphatic solvent system for the polymerization of butadiene to a high cis-1,4-polybutadiene utilizing as catalysts, mixtures of aluminum trialkyls, nickel salts of carboxylic acids and boron trifluoride ether complexes, which process is completely satisfactory for commercial operations to produce high cis-1,4-polybutadiene. It is also an object to provide a process whereby an increase in productivity of cis-1,4-polybutadiene is obtained. Another object is to reduce the amounts of catalyst components required to polymerize butadiene.

Therefore, it has been unexpectedly discovered that in order to provide a process for the continuous polymerization of butadiene to a high cis-1,4-polybutadiene, one has to continuously provide the catalyst in an insitu manner.

Thus, according to the invention, butadiene is continuously polymerized to a high cis-1,4 butadiene in an inert aliphatic or cycloaliphatic solvent system using a catalyst comprising a mixture of at least one (A) trialkylaluminum wherein the alkyl group contains from 2 to 8 carbon atoms, (B) at least one nickel salt of carboxylic acids and (C) at least one boron trifluoride complex of ethers, in which each of the individual catalyst components are continuously injected into the polymerization reaction vessel containing a mixture of the butadiene and the inert aliphatic or cycloaliphatic solvent.

It has been discovered that the best method for the introduction of each of the catalyst components into the butadiene and inert solvent mixture which is called the premix, is that each of the catalyst components be dissolved in the particular aliphatic or cycloaliphatic solvent to be employed and injected separately into the reaction vessel in close proximity to each other. Another method which has been utilized successfully is to mix the particular nickel salt of carboxylic acid and the particular boron trifluoride complex together and inject that mixture into the reaction vessel and separately inject the trialkylaluminum compound in close proximity to each other. Another method which has been successfully utilized is to mix the particular salt of the carboxylic acid and the particular trialkylaluminum together in a line just prior to injection into the reactor containing the premix and to separately inject the particular boron trifluoride complex into the reactor separately in close proximity to the mixture of the nickel and aluminum compounds. It has been observed that if all three catalyst components are premixed just prior to injection into the reactor, this procedure leads to plugging of the feed lines.

It has been discovered that the measuring or metering of the individual catalyst components can be best effected if each of the catalyst components are first dissolved in an inert solvent or diluent. It is best to use the same solvent for this purpose that is used as the solvent for the polymerization. The concentration of these catalyst components in the solvent is not at all critical and may range from 0.01 percent by weight up to 99 percent by weight. However, more accuracy is obtained if the concentrations are kept low such as below 5.0 percent and preferably below 1.0 percent.

As has been indicated, the catalyst system employed in the practice of this invention contains at least three components, the first component being a trialkylaluminum wherein the alkyl group contains 2 to 8 carbon atoms. Representative of such trialkylaluminums are triethyl aluminum, tri-n-butyl aluminum, triisobutyl aluminum, tri-n-propyl aluminum, triisopropyl aluminum, tripentyl aluminum, triisopentyl aluminum, tri-n-hexyl aluminum, triisohexyl aluminum, triheptyl aluminum, triisoheptyl aluminum, trioctyl aluminum, and triisooctyl aluminum. Of these, it is preferred to employ triethylaluminum or triisobutylaluminum.

The second catalyst component employed in the practice of the invention is a nickel salt of carboxylic acids. Representative of such compounds are nickel benzoate, nickel acetate, nickel naphthenate, nickel octanoate, nickel palmitate and nickel stearate. Of these, it is preferred to employ nickel octanoate and also nickel naphthenate.

The third catalyst component of this invention is a boron trifluoride complex of an ether. Where these boron trifluoride ether complexes are not commercially available, they may be readily formed by directly contacting boron trifluoride gas with the ether to be used as the complexing agent in about equal molar amounts. This contact is accomplished by reacting the desired amounts of $BF_3$ and the ether compound to form the $BF_3$ etherate. This is more conveniently performed and may be carried out in a medium of an inert organic diluent.

Representative examples of the boron trifluoride etherates suitable for use in this invention are boron trifluoride dipropyl etherate, boron trifluoride diisopropyl etherate, boron trifluoride di-n-butyl etherate, boron trifluoride diisobutyl etherate, boron trifluoride di-n-pentyl etherate, boron trifluoride diisopentyl etherate, boron trifluoride di-n-hexyl etherate, boron trifluoride diisohexyl etherate, boron trifluoride di-n-heptyl etherate, boron trifluoride di-n-octyl etherate and boron trifluoride diisooctyl etherate. Of these, it is preferred to use boron trifluoride di-n-butyl etherate.

The mole ratio of the various catalyst components to each other is of importance in the practice of this invention. Broadly, the mole ratio of the trialkyl aluminums to the nickel salt of the carboxylic acids may range from about 3/1 to about 90/1, with an intermediate range of from about 6/1 to about 60/1. The more desirable range being from about 12/1 to about 45/1. The mole ratio of the trialkylaluminums to the boron trifluoride etherates may broadly range from about 0.25/1 to about 1.2/1, with a more intermediate range of from about 0.35/1 to about 1.1/1. The more desirable range being from about 0.45/1 to about 0.85/1.

The amount of catalyst to be employed in the practice of this invention can vary somewhat. It might be broadly stated that the amount of catalyst expressed as the total parts of the nickel salt of carboxylic acid per 100 parts by weight of butadiene (NiO pts/100 BD) may range from about 0.001 to about 1. A more intermediate range would be from about 0.002 to about 0.1, with a more desirable range of from 0.003 to about 0.005. As has been indicated, one of the objects of this invention is to provide a process where increase of productivity of the cis-1,4-polybutadiene is obtained and to reduce the amount of catalyst required for the butadiene polymerization. It is quite possible that these amounts of catalyst may be exceeded, if the total amount of catalyst employed per 100 pounds of monomer is of no consequence to the user or if the polymerization process contains an excess amount of impurities. The catalytic amounts set forth are not considered to be restrictive but are set forth as a guide as to the amount to be employed.

The solvent system employed in the practice of this invention is an aliphatic hydrocarbon or cycloaliphatic hydrocarbon solvent. Representative of such solvents are butane, pentane, hexane, heptane, octane, cyclohexane and cyclopentane. One of the advantages of the practice of the process of this invention is that there is obtained an improvement in ecology. The practice of the process of this invention completely eliminates the use of aromatic solvents such as benzene or toluene. The protection of the environment continues to mitigate in favor of aliphatic or cycloaliphatic solvents in the polymerization of butadiene rather than the undesirable aromatic solvent systems.

The amount of solvent employed in the practice of this invention can vary widely from a butadiene/solvent weight ratio of from about 5 percent to about 25 percent. The exact amount of monomer to solvent depends of course on a number of factors, the main one being the viscosity of the mixture of the dissolved polybutadiene in the solvent. The more concentrated the polymer-solvent mixture, the higher the viscosity of the cement becomes. It is known that the heat transfer capabilities are reduced at higher viscosities. This viscosity of the polymer-solvent cement depends not only on the concentration of the polybutadiene in the solvent but possibly on the conversion, the molecular weight and the molecular weight distribution of the high cis-1,4-polybutadiene contained in the polymer solvent cement. Thus, one has to balance the viscosity of such a cement against the ability to remove the heat generated in the addition polymerization of the butadiene in order to control the temperature of polymerization. It has been observed that a weight ratio of butadiene to solvent of from about 10 to about 25 percent has produced a polybutadiene solvent cement which can be adequately handled in a commercial operation.

The polymerizations of this invention are usually conducted employing air-free and moisture-free techniques.

The temperatures employed have not been found critical and may vary from about 0° up to 110° C, for example with from about 30° to 90° C being more desirable. The pressures are usually ambient but both higher and lower pressures are possible if desired.

The invention is further illustrated by reference to the following examples which are intended to be representative rather than restrictive of the invention. In these examples, $BF_3.Bu_2O$ is boron trifluoride dibutyl etherate, TEA is triethylaluminum and NiO is nickel octanoate.

EXAMPLE I

In a two reactor chain, connected in series, equipped with heat transfer capabilities and agitation capabilities, each reactor having a capacity of approximately 102 liters, there was continuously charged at the rate of approximately 36 kilograms per hour (kgms/hr) a premix of 16 percent by weight of 1,3-butadiene in n-hexane. To this mixture of butadiene and hexane there was continuously added the three catalyst components NiO as a 0.05 percent by weight solution in hexane, TEA as an 0.5 percent by weight in hexane solution and $BF_3.Bu_2O$ as an 0.5 percent by weight hexane solution in the amounts and weight ratios as set forth in the table below. The polybutadiene was short-stopped with a 10 percent solution of rosin acid in hexane and an antioxidant hexylated-p-cresol, 10 percent in hexane, was added in the amounts as set forth in the table below.

Table 1

| | | | | |
|---|---|---|---|---|
| NiO pts/100 monomer | 0.006 | 0.0039 | 0.008 | 0.0058 |
| TEA/NiO (wt) | 12.1 | 18.2 | 16.1 | 11.99 |
| TEA/$BF_3$ (wt) | 1.37 | 0.91 | 1.50 | 1.15 |
| Temp (° F) | 172 | 156 | 156 | 151 |
| First reactor % conversion | 70.3 | 52.4 | 56.8 | 68.2 |
| Second reactor % conversion | 80.6 | 69.3 | 78.2 | 79.0 |
| Hold time (hrs) | 4.29 | 4.31 | 4.15 | 4.35 |
| Final Mooney viscosity M/$L_4$ | 54 | 64 | 45.5 | 81 |
| DSV | 2.90 | 3.07 | 3.16 | 3.64 |
| Shortstop parts per 100 parts polymer | 1.08 | 1.06 | 0.97 | 1.03 |
| Antioxidant parts per 100 parts polymer | 1.03 | 0.84 | 0.91 | 1.03 |
| Avg premix charge rate (lb/hr) (kgms) | 36.79 | 36.40 | 38.06 | — |

The polybutadiene produced in the polymerizations above had a cis-1,4 configuration of over 95 percent.

To illustrate the improvement obtained by a continuous insitu injection of the catalyst into the reactor containing the mixture of aliphatic solvent and butadiene, the applicants present the following data.

In a butadiene polymerization process utilizing the catalyst system described in U.S. Pat. No. 3,170,907 and using the preforming techniques of U.S. Pat. Nos. 3,464,965 and 3,471,462 over a long period of time, it was determined that using continuous preformed catalysts in accordance with the techniques of these patents that an average conversion obtained was 67.5 percent.

When the butadiene was polymerized over a long period of time using the continuous catalyst addition technique described in this application, it was determined that the average conversion had increased to 74.9 percent, indicating a change of a 11 percent increases in overall average conversion. Due to the fact that the catalyst techniques of this invention provide a more active catalyst system than that of the continuous preformed catalyst system of the prior art, the applicants were able to increase the continuous flow rate of the reactants to the reactor which resulted in an overall increase in productivity from the same size equipment of 18.4 percent. As the same time, the total usage of catalyst decreased on an average of 25 percent.

It is contented that an 11 percent increase in conversion utilizing the continuous insitu catalyst system takes on even more significance when it is coupled with the 18.4 percent increase in productivity, the 11 percent increase in conversion with the 25 percent decrease in total catalyst consumption. It is contended that this 11 percent increase in conversion, the 18 percent increase in productivity being accompanied with a 25 percent decrease in total catalyst consumption are totally unexpected, non-obvious and non-predictable benefits, which benefits lead to the patentability of the invention disclosed and claimed herein.

While certain representative embodiments and details have been shown for the purpose of illustrating the invention, it will be apparent to those having skill in this art that various modifications and changes may be made therein without departing from the spirit or scope of the invention.

What is claimed is:

1. A method of preparing high cis-1,4-polybutadiene which comprises continuously polymerizing butadiene in mixture with an inert aliphatic or cycloaliphatic solvent employing as a catalyst a mixture comprising (A) at least one trialkyl aluminum wherein the alkyl group contains from 2 to 8 carbon atoms, (B) at least one nickel salt of carboxylic acids and (C) at least one boron trifluoride complex of ethers, wherein the mole ratio of the trialkyl aluminum to the nickel salt of carboxylic acid ranges from about 3/1 to about 90/1 and the mole ratio of the aluminum trialkyl to the boron trifluoride etherates ranges from about 0.25/1 to about 1.2/1, in which each of the individual catalyst components are continuously and separately injected into the polymerization vessel containing the mixture of butadiene and inert solvent.

2. The method according to claim 1 in which the individual catalyst components are dissolved in the particular aliphatic or cycloaliphatic solvent in which the butadiene is dissolved.

3. The method according to claim 1 in which the trialkyl aluminum employed in triethylaluminum, the nickel salt of carboxylic acid is nickel octanoate and the boron trifluoride complex employed is boron trifluoride di-n-butyl etherate.

4. The method according to claim 1 in which the mole ratio of the trialkyl aluminum to the nickel salts of carboxylic acids ranges from about 6/1 to about 60/1 and in which the mole ratio of the trialkyl aluminum to the boron trifluoride etherates ranges from about 0.35/1 to about 1.1/1.

5. The method according to claim 3 in which the mole ratio of the triethylaluminum to the nickel octanoate ranges from about 12/1 to about 45/1 and the mole ratio of the triethylaluminum to the boron trifluoride di-n-butyl etherate ranges from about 0.45/1 to about 0.85/1.

* * * * *